(12) United States Patent
Specht

(10) Patent No.: US 6,283,398 B1
(45) Date of Patent: Sep. 4, 2001

(54) SEAT BELT RETRACTOR

(75) Inventor: Martin Specht, Feldafing (DE)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 09/485,483

(22) PCT Filed: Aug. 4, 1998

(86) PCT No.: PCT/IB98/01190

§ 371 Date: Feb. 9, 2000

§ 102(e) Date: Feb. 9, 2000

(87) PCT Pub. No.: WO99/07582

PCT Pub. Date: Feb. 18, 1999

(30) Foreign Application Priority Data

Aug. 12, 1997 (DE) ............................................. 197 34 907

(51) Int. Cl.[7] .................................................. B60R 22/405
(52) U.S. Cl. ..................................... 242/383.4; 242/384.6
(58) Field of Search ............................... 242/383.4, 384, 242/384.5, 384.6; 280/806; 297/478

(56) References Cited

U.S. PATENT DOCUMENTS 4,603,819 * 8/1986 Loose et al. .
5,205,025 * 4/1993 Kielwein .
5,487,515 * 1/1996 Hishon et al. ..................... 242/383.4
5,622,327 * 4/1997 Heath et al. ....................... 242/383.4

FOREIGN PATENT DOCUMENTS

0092407-A2 * 10/1983 (EP) .
0631911-A1 * 1/1995 (EP) .

* cited by examiner

Primary Examiner—John M. Jillions
(74) Attorney, Agent, or Firm—Markell Seitzman

(57) ABSTRACT

The invention relates to a seat belt retractor comprising a seat belt spool (2) rotationally mounted on a frame (1) for winding and unwinding the seat belt, a blocking means (5) for blocking the rotation of the seat belt spool, a control element (6) by means of which the blocking means (5) can be actuated, a seat belt sensor mass (4) movably mounted on a support element (3) which rotates with the seat belt spool (2), a vehicle sensor mass (35) and a coupling device (14, 34) by means of which a moving connection can be established between the support element (3) and the control element (6) via the seat belt sensor mass (4) and/or the vehicle sensor mass (35). Said connection assures the transmission of a rotation of the seat belt spool in the direction of unwinding for actuating the blocking means. The support element (3) together with the seat belt sensor mass (4) positioned thereon and the control element (6) constitute a pre-assembled component unit (7).

21 Claims, 10 Drawing Sheets

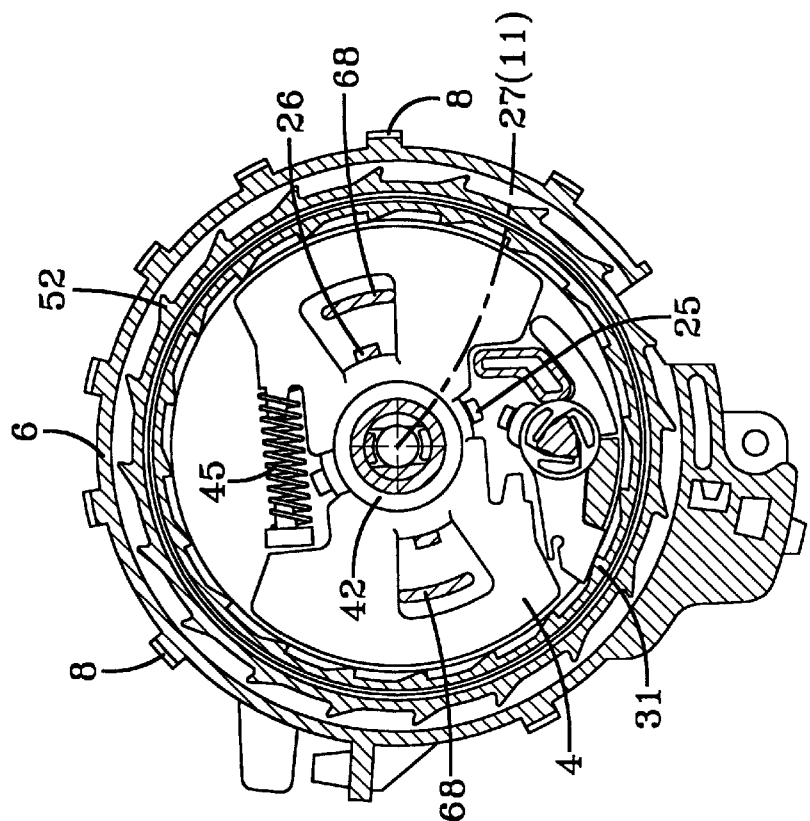
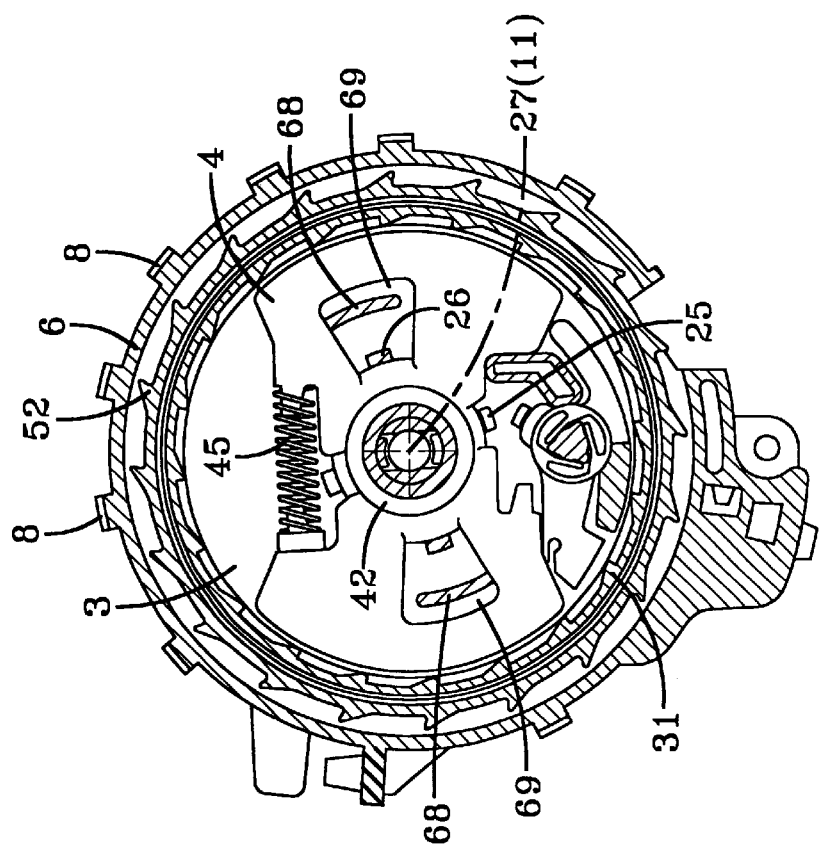
FIG-2
FIG-3

SEAT BELT RETRACTOR

BACKGROUND AND SUMMARY OF THE INVENTION

The invention relates to a seat belt retractor.

In a conventional seat belt retractor a belt reel is rotatably mounted on a frame for coiling and uncoiling the seat belt, a motive spring is able to act on the belt reel in the coiling direction. A blocking device is provided for blocking rotation of the belt reel, in particular in the case of excessive acceleration or deceleration of the vehicle, for example in the case of an accident. This can be achieved in that a blocking pawl, supported on the frame and having corresponding teeth, is brought into engagement with the belt reel, or blocking teeth provided on the belt reel are brought into blocking engagement with corresponding teeth on the frame. The movement between the pawl and the belt reel or between the belt reel and the frame required for this purpose is brought about by a control member which can be activated in response to the belt webbing and/or in response to the vehicle (i.e. in a belt webbing-sensitive and/or a vehicle-sensitive manner). A belt sensor mass which is movably mounted on a carrier member rotating with the belt reel is provided for activation of the control member in response to the speed at which the belt webbing is protracted from the retractor. A vehicle sensor mass is provided for activation of the control member in response to the vehicle deceleration. Both the belt sensor mass and the vehicle sensor mass actuate a coupling device, for example in the form of movable coupling elements on the carrier member and control member, by means of which a moving connection between carrier member and control member is produced in order to transmit a rotation of the belt reel in the uncoiling direction for actuating the blocking device.

In order to transmit the movement of rotation of the belt reel in the uncoiling direction to actuate the blocking device for controlled blocking engagement of the belt reel on the frame or of a blocking element, in particular blocking pawl, supported on the frame into the belt reel, it is necessary with known seat belt retractors to maintain exact tolerances of a movement-transmitting means and the blocking engagement elements with respect to the belt reel. This necessitates high production costs, in particular during assembly of the components provided on the mechanical side of the belt retractor.

It is accordingly an object of the invention to create a seat belt retractor of the type mentioned at the outset in which the fitting, in particular of the components provided on the mechanical side, is simplified.

With the invention, a preassembled unit consisting of the carrier member and the belt sensor mass mounted thereon and the control member is provided. These components can be preassembled in an exact orientation relative to one another, in particular with respect to a common axis which coincides with the reel axis after assembly. Both the belt sensor mass and the carrier member and the control member are mounted on one another rotatably about this common axis in the unit. The carrier member and the control member are preferably connected rotatably relative to one another to the unit by a plug-in connection forming a pivot bearing.

The control member preferably possesses a rim which surrounds the unit and on which clip elements are arranged. These clip elements can be clipped into correspondingly designed clip elements of a holder about the common axis rotatably in the holder. The holder with the unit mounted rotatably therein surrounds the entire mechanical side of the belt retractor. This consists of the components which respond to the vehicle and to the belt webbing, of the carrier for the belt webbing sensor which is connected non-rotatably to the belt reel when the holder is plugged onto the frame with the belt reel, and the control member which is mounted rotatably in the holder and can be coupled to the carrier member designed, in particular, as a ratchet wheel so as to respond to the belt webbing and/or vehicle by means of corresponding coupling elements.

To produce the rotational connection between the carrier member and the belt reel, projections and associated recesses can be provided on the carrier member and the belt reel which are plugged into one another.

The invention also provides a seat belt of the type mentioned at the outset with which forces acting, in particular, during tensioning of the belt webbing due to accelerated rotation of the belt reel on the coupling element mounted on the carrier member and actuated by the belt sensor mass do not affect the coupling function.

In this embodiment, a coupling element actuated by the belt sensor mass, in particular in the form of a two-sided lever of the type known from DE 195 01 679 A1, incorporated herein by reference, is movably mounted on the carrier member by means of an impact energy-absorbing bearing. Owing to the impact absorbing-properties of the bearing for the coupling element, the forces acting on the coupling element during tensioning of the belt webbing due to an accelerated rotational drive of the belt reel, do not adversely affect the coupling function. Varying loads occurring during tensioning, in particular at the beginning of tensioning or during a changeover between the individual driving stages in the case of multi-stage tensioner drive and at the end of the tensioning process are cushioned by the energy-absorbing bearing of the coupling element so that the coupling element and the coupling parts, in particular the teeth of the control member in which the coupling element engages, with its engagement part designed, in particular, as a pawl, are not damaged.

For forming the impact energy-absorbing bearing, one or more shock-absorbing bearing faces can be provided on the coupling element, in particular as a function of the main loading direction. If loads occur in several directions or within a greater angular range, several shock-absorbing bearing faces are provided. In a preferred embodiment, three or more flexible rectilinear bearing faces which are arranged in an equilateral polygon, in particular a triangle, will be disposed round a central point. In the disengaged coupling position of the coupling element, the flexible bearing faces lie on rounded bearing positions of a bearing pin fastened on the carrier member in the centre of the triangle. In the engaged position of the coupling element, i.e. when the coupling element engages in the associated coupling element on the control member, for example in the form of teeth, the flexible rectilinear bearing faces of the coupling element lie flat on support faces of the bearing pin which then extend approximately in parallel. These support faces are formed, for example, by projections on the bearing pin which are arranged at equal angular pitch round the pivot axis of the coupling element defined on the bearing pin.

The rectilinear flexible bearing faces on the coupling element can be formed by blades which, at one end, are rigidly connected, in particular integrally, to the coupling element body and, with free ends, project into a recess in the coupling element body. The blades are designed to be flexibly resilient so that the energy-absorbing effect is therefore achieved when the coupling element is subjected to excessive loads.

Additional bearing elements having support faces over a circle round the pivot axis of the coupling element can also be provided. Support faces can also be provided on additional bearing elements on which the coupling element is additionally supported in its engaged position.

Furthermore, the coupling element can rest with an impact energy-absorbing contact face on the belt sensor mass, at least on the lever arm on which the engagement part, in particular in the form of a pawl on the coupling element, is provided. This impact energy-absorbing contact face can also be formed by a resiliently flexible blade which is shaped integrally onto the coupling element.

The coupling device which produces a preblocking state introducing the main blocking process can also have a coupling element, for example in the form of a pawl, mounted movably, in particular pivotally on the control member. This coupling element is brought into coupling engagement with the carrier member, in particular with peripheral teeth on the disc-shaped carrier member by the vehicle sensor mass when an excessive acceleration acts on the vehicle.

Owing to the coupling device, therefore, a preblocking state can be produced between the carrier member preferably designed as a ratchet wheel and the control member preferably forming the outer covering of the preassembled component in the invention. Control member and carrier member are non-rotatably connected to one another so as to transmit a rotation of the reel in the belt webbing uncoiling direction for actuating the blocking device.

The blocking device preferably contains at least one blocking pawl which is supported on the frame and can be brought into main blocking engagement with the belt reel by the control movement of the control member. For this purpose, a control face along which a movement-transmitting element is guided acts between the blocking pawl and the control member. The control face is preferably provided on the blocking pawl and the movement-transmitting element, for example in the form of a pin, on the control member. It is also possible, however, to provide the control face on the control member and the movement-transmitting element on the blocking pawl.

An end stop for the movement of the movement-transmitting element is provided on the control face. This end stop is located in an overtravel position in order to compensate differences in the angular pitch between the teeth participating in the preblocking and main blocking processes.

The preblocking state can obviously also be used in such a way that, in the case of an automatic lift roller device, the belt reel, which is blocked against further rotation during the preblocking process, is engaged by its blocking teeth in opposing teeth provided on the frame.

The control member, the carrier member which can be designed as a ratchet wheel, and the coupling elements, which can be actuated in response to the belt webbing and vehicle, are preferably produced from plastics material. The sensor masses which respond to the belt webbing and the vehicle are traditionally produced from metal.

An embodiment of the invention will be described in more detail with reference to the figures, in which:

BRIEF DESCRIPTION OF THE DRAWINGS

FIG. 2 is a plan view of the arrangement of the belt sensor mass and of the associated coupling element in the normal operating position;

FIG. 3 is a plan view of the arrangement of the belt sensor mass and of the associated coupling element on the carrier member in the coupled position (preblocking state);

DETAILED DESCRIPTION OF THE DRAWINGS

Figure 1:
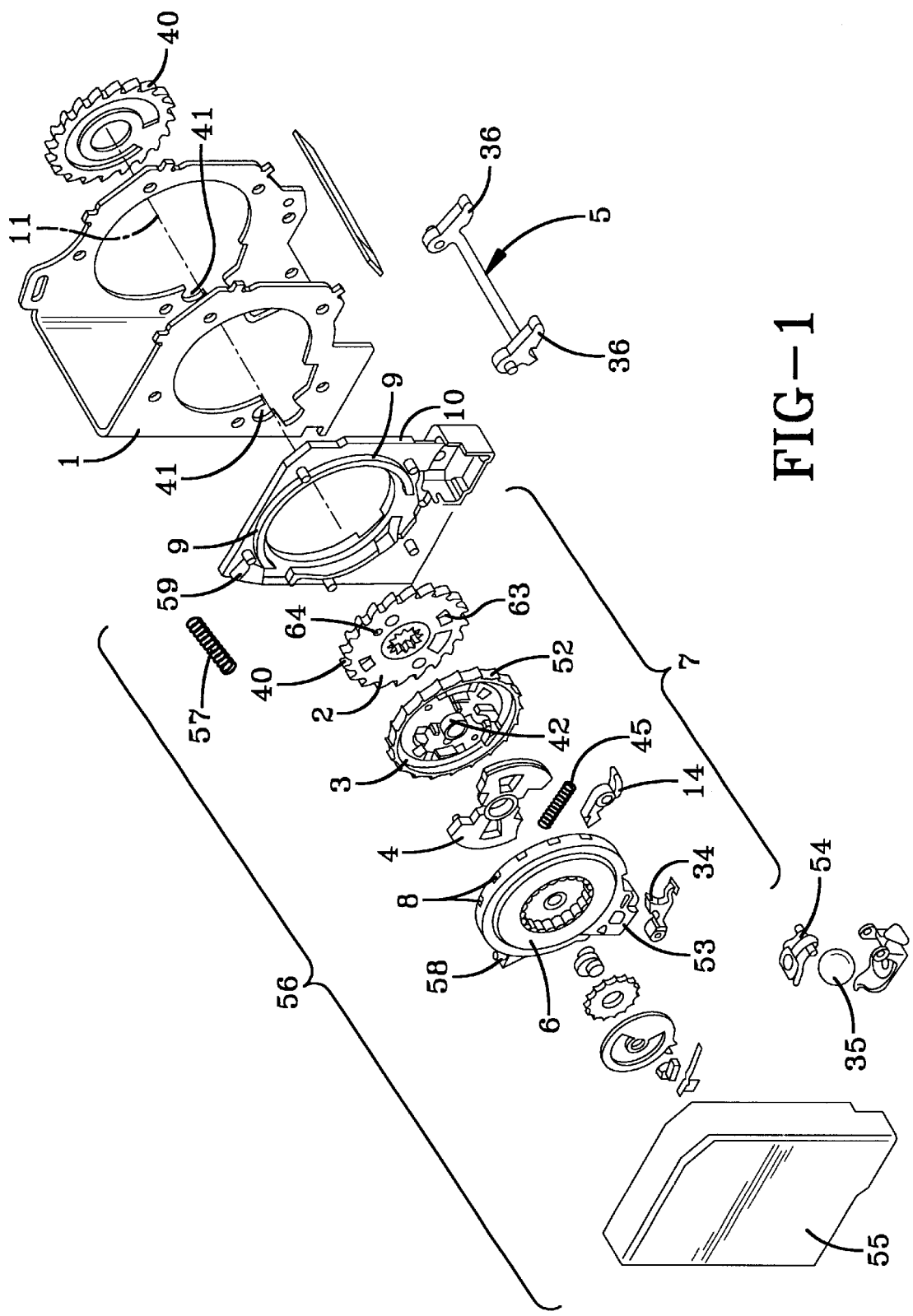
FIG. 1 is a perspective exploded view of the components on the mechanical side of a seat belt retractor forming an embodiment of the invention.
Figure 9:
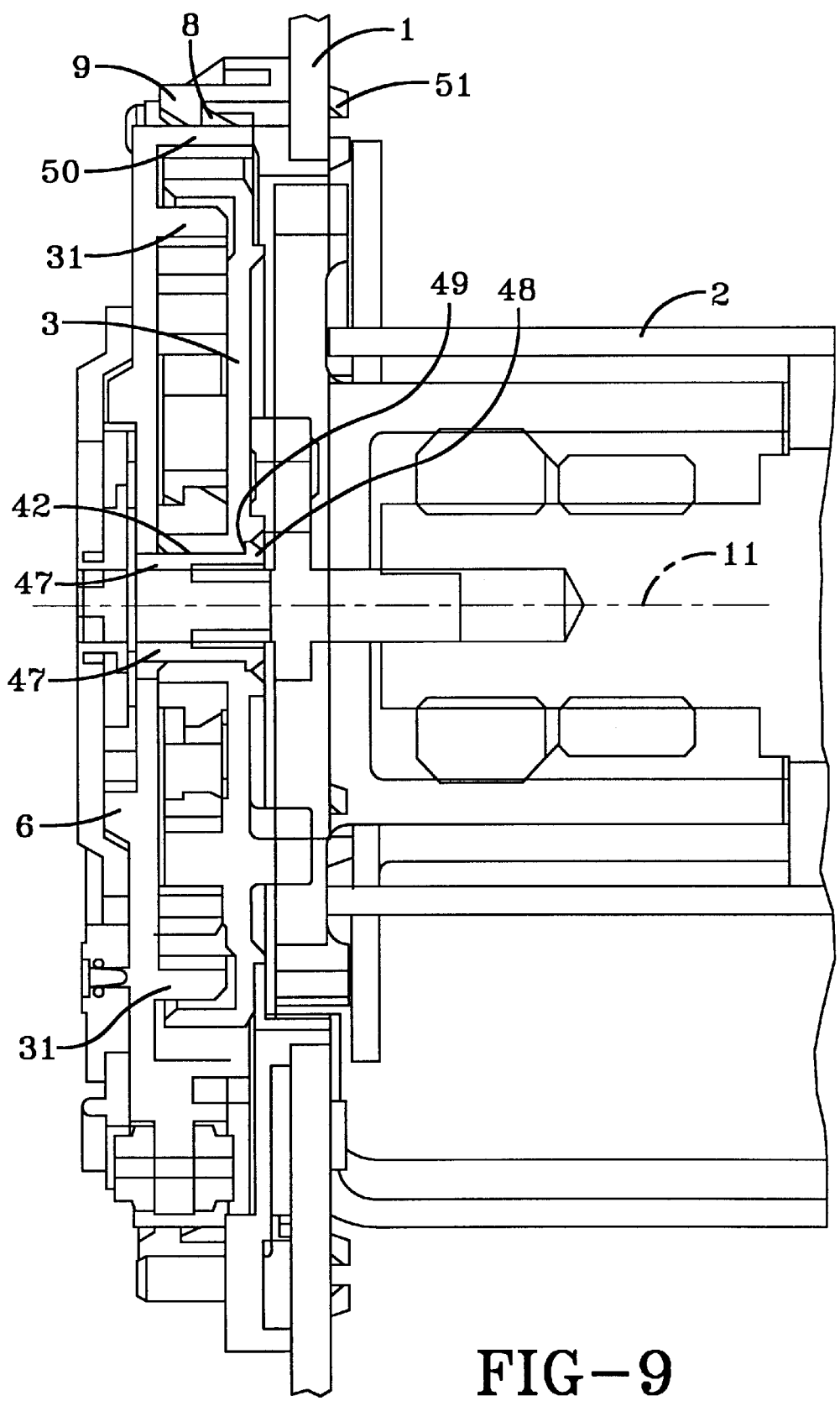
FIG. 9 is a sectional view of the assembly of the components on the mechanical side of the seat belt retractor.
Figure 10:
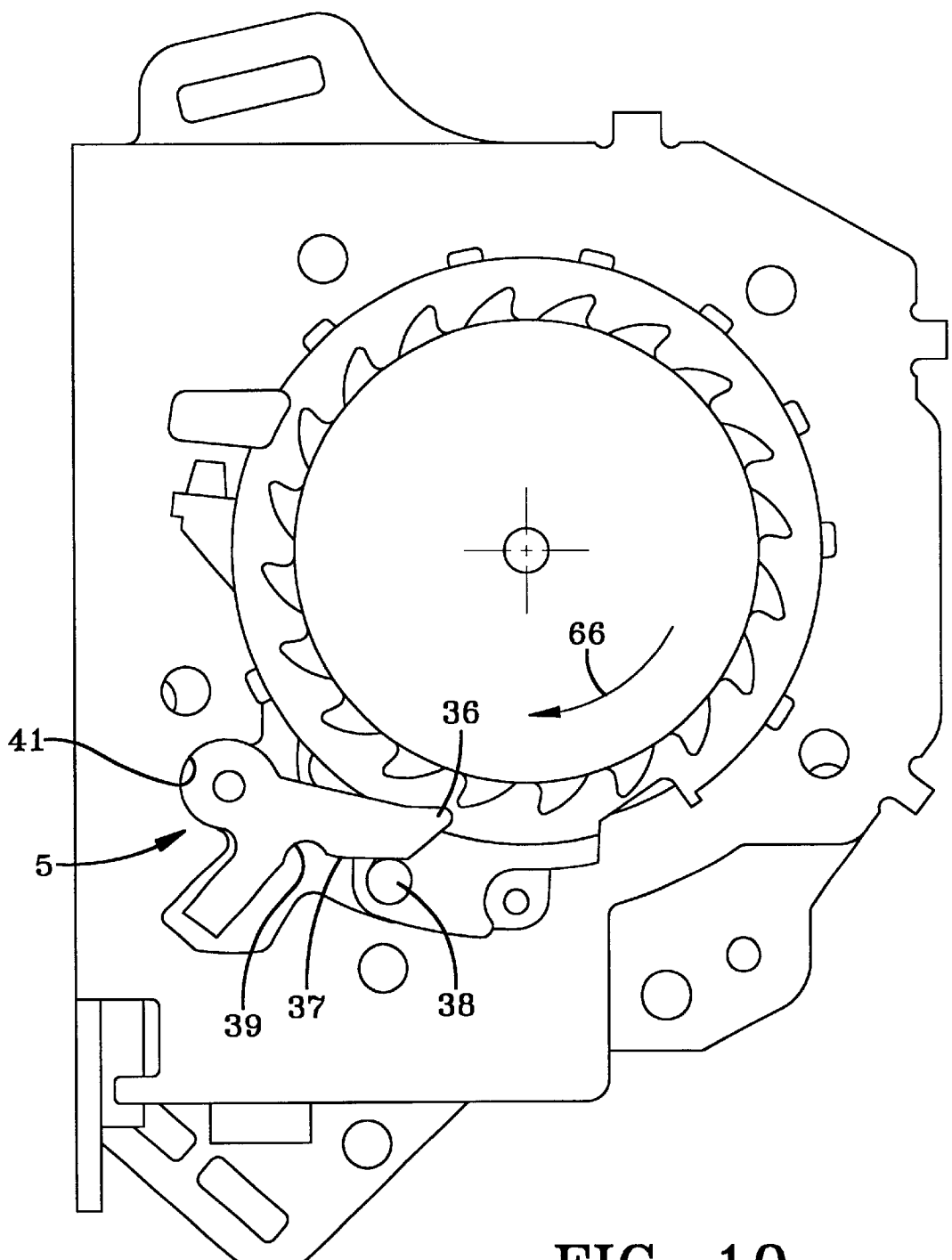
FIG. 10 is a side view of the positioning of a blocking pawl relative to the belt reel during normal operation.
Figure 11:
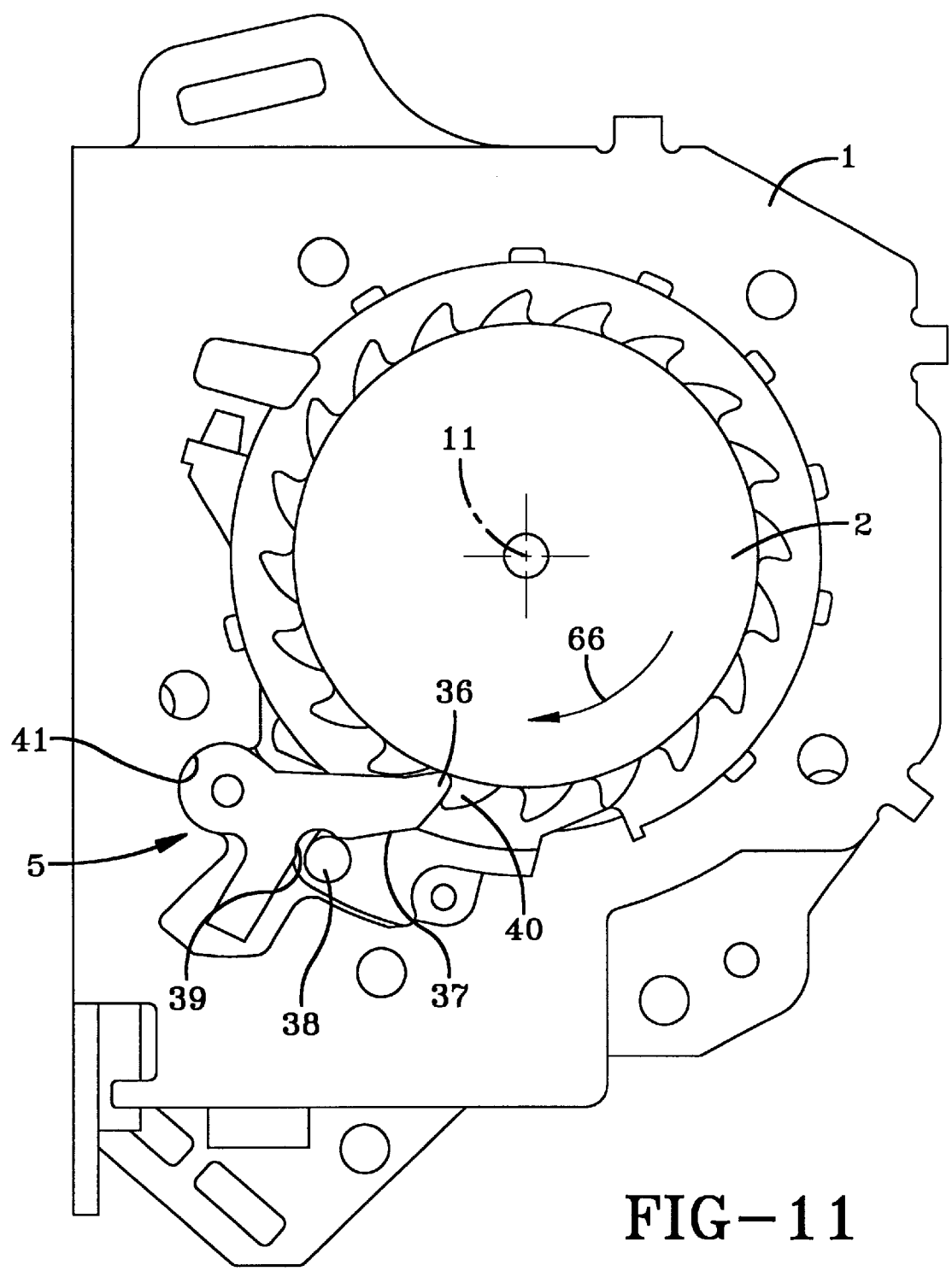
FIG. 11 shows the positioning of the blocking pawl in blocking engagement with the blocking teeth of the belt reel.

As shown in FIG. 1, the seat belt retractor has a U-shaped frame 1. A belt reel 2 (FIG. 9) of which the lateral internal gears are shown in FIG. 1 is rotatably mounted in this frame for coiling and uncoiling a seat belt webbing. A motive spring not shown in detail acts on the spring side of the frame 1 in the coiling direction. The belt reel 2 is blocked by a blocking device 5 which comprises blocking pawls 36 for two-sided blocking engagement with blocking teeth 40 of the belt reel 2 in the embodiment illustrated. The blocking device 5 is pivotally supported on support faces 41 on the frame 1 (FIGS. 1 and 10 to 12).

The seat belt retractor has a mechanical side for sensor-induced actuation of the blocking device 5. The components of the mechanical side are a carrier member 3 designed as a ratchet wheel, a control member 6, a belt webbing sensor mass 4 mounted rotatably on the carrier member 3, a vehicle sensor mass 35 and coupling elements 14 and 34 which can be actuated by the belt webbing and vehicle sensor masses. In the embodiment illustrated, these components are preassembled in a manner which will be described in detail hereinafter to form a unit representing a closed tolerance system which is independent of the belt reel 2.

As shown in FIG. 2 and 3, the belt sensor mass 4 consisting of metal is mounted rotatably on the carrier member 3. For this purpose, a bearing ring 42 is shaped on the carrier member 3 around an axis 27 coinciding with the reel axis 11 in the assembly. Clip elements 25, 26 which support the belt sensor mass 4 axially on the carrier member 3 are also provided around the axis 27 on the carrier member 3. The clip elements can be formed integrally from the material of the carrier member, in particular plastics material. Clip rims which lie behind the overlapping clip elements 25, 26 (see FIG. 4) when assembled are shaped on the belt sensor mass 4 for this purpose.

Figure 4:
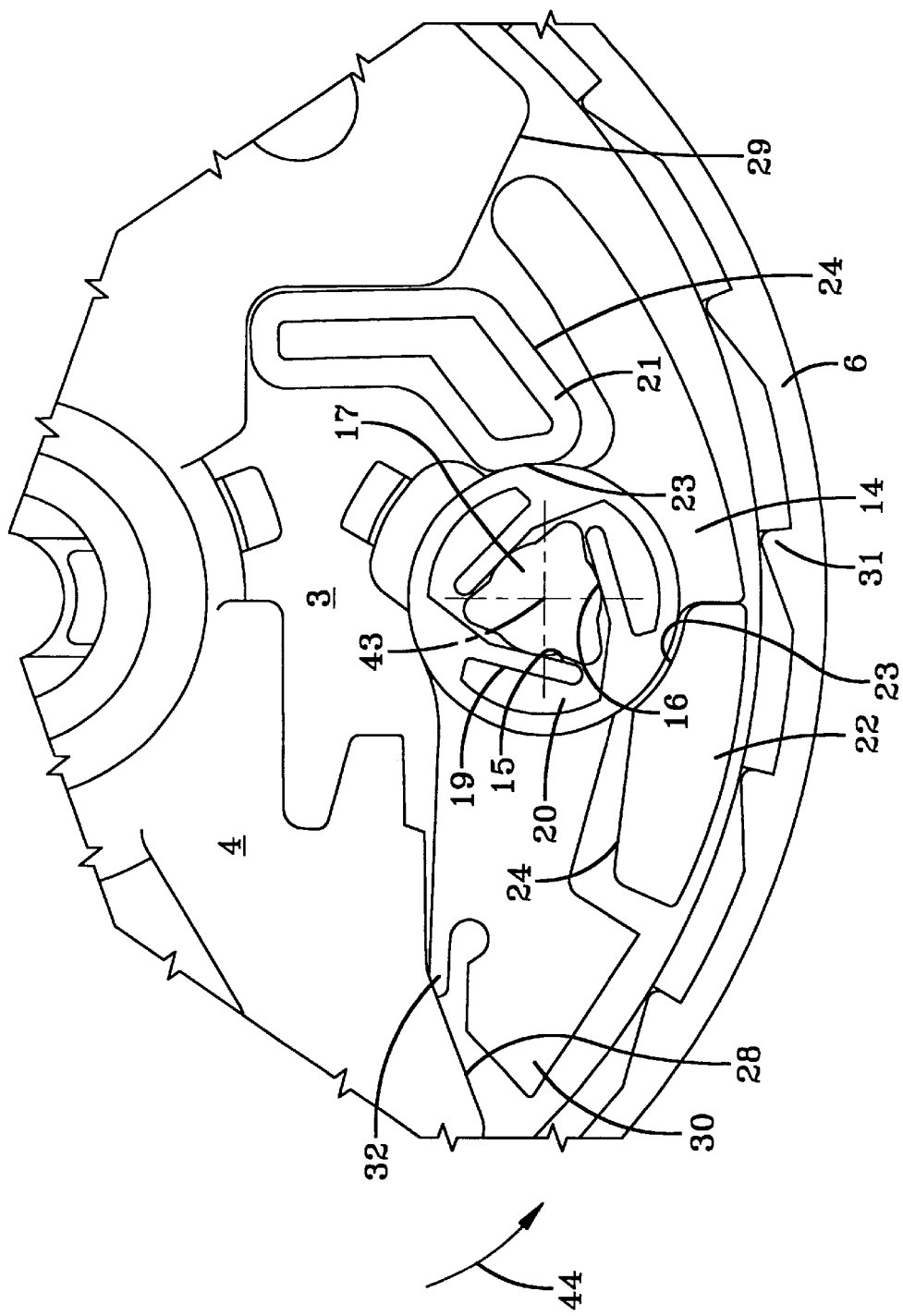
FIG. 4 is an enlarged view of the coupling element actuated by the belt sensor mass in the normal operating position corresponding to FIG. 2.
Figure 5:
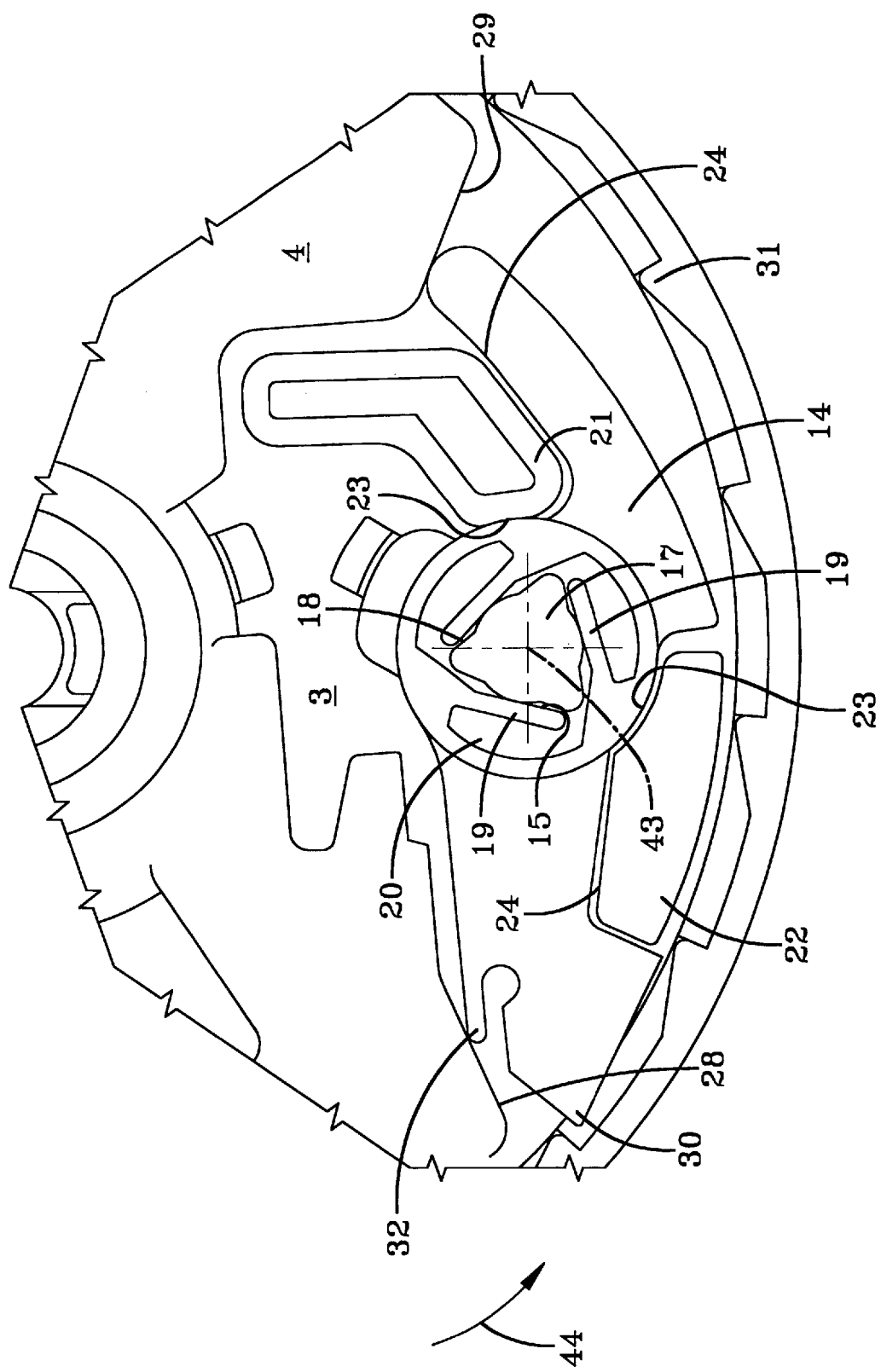
FIG. 5 is an enlarged view of the coupling element actuated by the belt sensor mass in the engaged position, corresponding to the operating state shown in FIG. 3.

As also shown, in particular, in FIG. 4 and 5, two control faces 28 and 29 are provided on the belt sensor mass 4.

Lever arms of the coupling element 14 designed as a two-sided lever rest on these control faces. The coupling element 14 is arranged pivotally around an axis 43. The axis 43 is defined by a bearing pin 17. The bearing pin 17 is shaped integrally on the carrier member 3 and can also consist of plastics material.

The rotational mounting of the coupling element 14 designed as a two-sided lever on the carrier member 3 is designed to absorb energy, in particular impact energy. Blades 19 are provided which are shaped on the coupling element body and project with free ends into the recess 20 of the coupling element 14 for this purpose. The blades 19 form resilient rectilinear bearing faces 15 which rest on rounded bearing positions 16 of the bearing pin 17 in the normal operating position (FIGS. 2 and 4). In the engaged state (FIGS. 3 and 5), the rectilinear bearing faces 15 of the coupling element 14 rest flat on support faces 18 which extend approximately parallel thereto and are formed by projections on the bearing pin 17. A flat connection is therefore produced between the bearing pin 17 and the coupling element 14 in the engaged position of the coupling element 14, the blades 19 having an energy-absorbing effect, in particular in the case of impact loads, which can occur during tensioning of the belt webbing owing to accelerated rotation of the belt reel. Destruction of the bearing position 16, in particular breakage of the bearing pin, is prevented under these extreme varying loads.

Further bearing elements 21 and 22 consisting, in particular, of plastics material are shaped integrally on the carrier member 3. These bearing elements 21 and 22 have additional support faces for supporting the coupling element 14 on the carrier member 3. Support faces 23 are shaped on the additional bearing elements 21, 22 in a circle round the pivot axis 43. Pivot bearing elements capable of absorbing forces acting on the coupling element 14 in the support faces are thus created in addition to the blades 19 resting in an equilateral triangle on the bearing journal 17. Further support faces 24 against which the coupling element 14 rests in its engaged position (FIGS. 3 and 5) in the region of its two lever arms can also be provided on the bearing elements 21 and 22.

An impact energy-absorbing blade 32 forms an impact energy-absorbing contact face of the coupling element 14 with the control face 28 of the belt sensor mass 4. One of the lever arms of the coupling element 14 is provided with the engagement part 30, for example in the form of a pawl on the coupling element 14. Impact loads which act on the coupling element 14 at this position, in particular during tensioning, are cushioned by the energy-absorbing effect of the shaped blade 32, so that destruction of the coupling element 14 is avoided.

The belt sensor mass 4 and the coupling element 14 are also driven in the belt coiling direction (arrow 44) round the reel axis 11 during tensioning with accelerated rotation of the belt reel owing to the rotational connection between the carrier member and the belt reel, the engagement part 30 scraping over the coupling part 31, designed as teeth, on the control member 6. The varying loads occurring in the process are cushioned by the blade 32 and also by the energy-absorbing mounting brought about by the plates 19 and are reduced to such an extent that no destruction occurs.

As already explained, the preblocking state is achieved by bringing the engagement part 30 on the coupling element 14 into engagement with the coupling part 31 provided in the form of an internal ring gear on the control member 6 (FIGS. 3 and 5). This is effected in that, during a corresponding accelerated rotation of the belt reel in the unwinding direction of the belt and associated accelerated rotation of the rotating part, the belt sensor mass 4, owing to its inertia, pivots round the axis 27 coinciding with the reel axis 11 from the position shown in FIG. 2 into the position shown in FIG. 3 against the force of a sensor spring 45 in relation to the carrier member 1. The engagement part 30 is thus engaged in the corresponding coupling element 31, designed as teeth, on the control member 6 owing to the action of the control face 29 on the coupling element 14.

The rotational connection between the carrier member 3 and the control member 6, representing the preblocking state, is produced in this way. As shown, in particular, in FIGS. 6, 7 and 9, the carrier member 3 which is designed as a ratchet wheel and on which the belt sensor mass 4 and the coupling element 14 are movably mounted in the described manner is assembled with the cap-shaped control member 6 to form a unit. For this purpose, a bearing ring 47 (see FIG. 9) shaped on the control member 6 is inserted into a central orifice of the bearing ring 42 on the carrier member 3. The bearing ring 47 is formed from ring segments which can be deformed radially inwardly during assembly of the control member and the carrier member and move radially outwardly again after the two parts have been plugged together, so that clip elements 48 at the free ends of the ring segments of the bearing part 47 overlap a support shoulder 49 on the bearing ring 42. In this way, the carrier member 3 and the control member 6 are rigidly connected to one another in the axial direction. The connection is such that the carrier member 3 opposite the control member 6 are held together rotatably in the pivot bearing created by the two bearing rings 42 and 47.

Projections 8 forming clip elements which come into engagement with clip elements 9 on the holder 10 (see FIGS. 1, 7 and 9) are located on the external face of a rim 50 on the control member 6. The holder 10 can be fastened on the frame 1 by means of fasteners 51 which can also be designed as clip elements or plug-in connection elements.

The intermeshing clip elements 8 and 9 on the rim of the control member 6 and on the holder 10, which are arranged in concentric circles, form a pivot bearing for the pivotal arrangement of the control member 6 on the frame 1 or in the holder 10 during assembly of the preassembled component 7. The pivot bearing formed by the intermeshing clip elements 8 and 9 ensures that the control member 6 is mounted pivotally around the reel axis 11.

To enable the coupling device on the mechanical side also to respond to the vehicle deceleration, the control member 6 in the embodiment is provided with a further coupling element 34 with a pawl which can be brought into engagement with teeth 52 on the carrier member 3 designed as a ratchet wheel. The engagement movement is brought about by the vehicle sensor mass 35 which can be mounted on the control member 6 or on the holder 10. If an excessive acceleration acts on the vehicle, the vehicle sensor mass 35 is displaced and therefore moves the pawl provided on the coupling element 34 into engagement with the teeth 52 on the rim of the disc-shaped carrier member 3 (ratchet wheel). A bearing position for the pivotal mounting of the coupling element 34 on the control member 6 is designated by 53. The movement of the spherical vehicle sensor mass 35 can be transmitted to the coupling element 34 by a movement-transmitting part 54 provided pivotally on the holder 10. The preblocking state, i.e. the non-rotatable connection between the carrier member 3 and the control member 6, is thus produced as a function of an increased acceleration of the vehicle.

After assembly of the unit 7 consisting of the carrier member 3 and the control member 6 with the belt sensor mass 4 arranged between their faces turned toward one another, on the holder 10 and installation of the vehicle sensor (vehicle sensor mass 35 and movement-transmitting element 54), a covering flap 55 can be clipped onto the holder 10. This preassembled unit 56 can then be fastened on the mechanical side of the frame 1.

Figure 7:
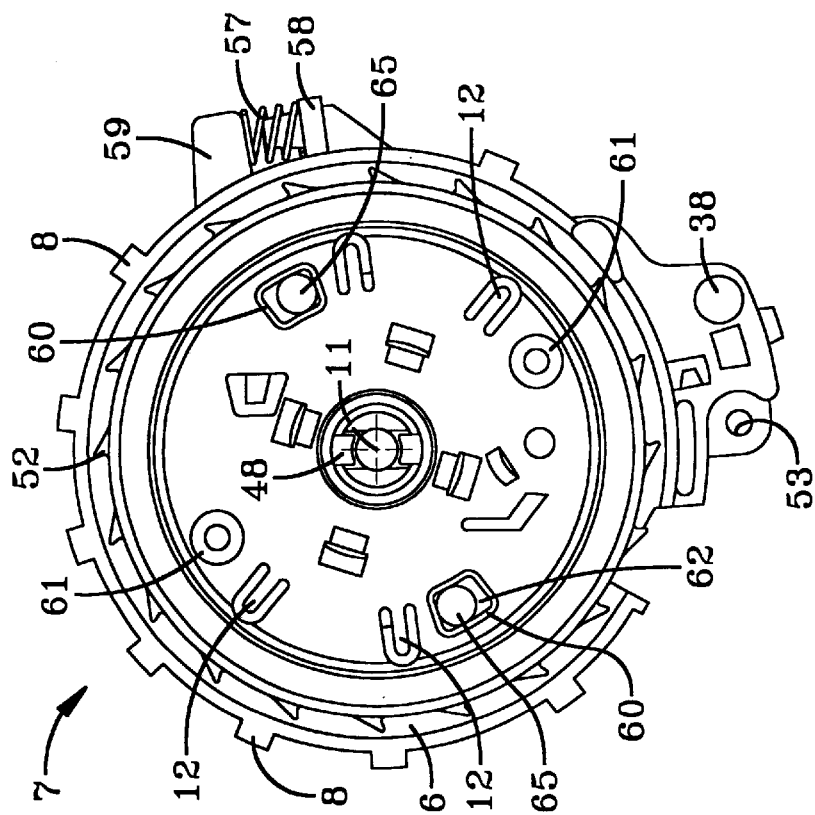
FIG. 7 is a plan view of the back of the carrier member, facing the belt reel, in the preblocking position.
Figure 6:
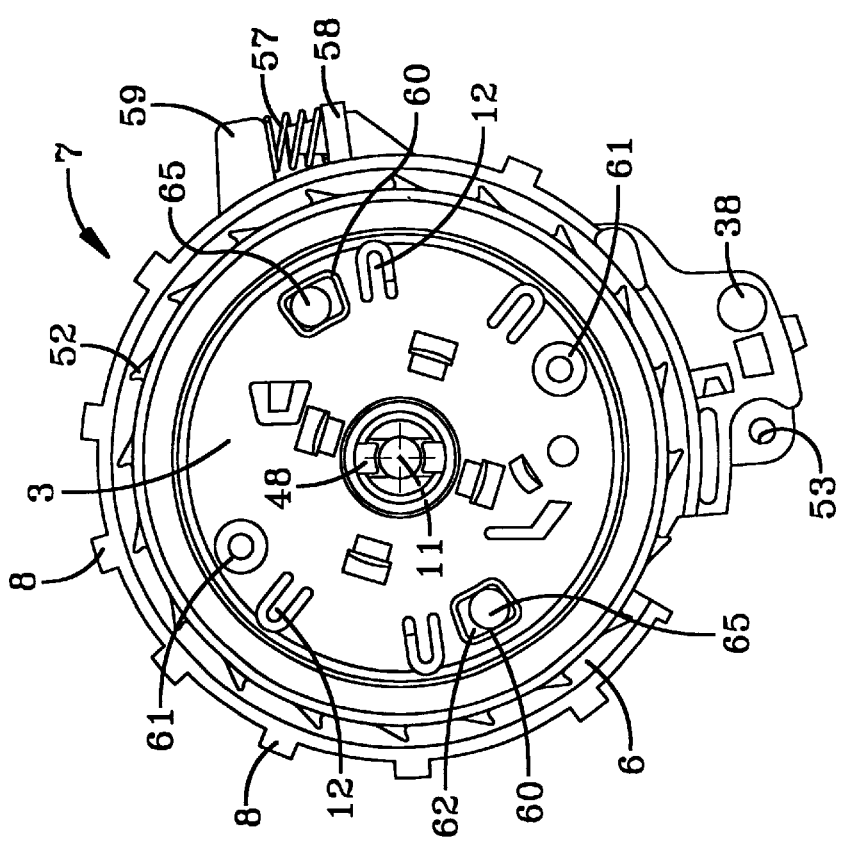
FIG. 6 is a plan view of the back of the carrier member, facing the belt reel, in the normal operating position.

As shown in particular in FIGS. 6 and 7, the clip elements 8 are located on the external face of the circular rim 50 on the control member 6 within an angular range which is greater than 180°, in particular 250° to 260°, for example 255°. Adequate low-friction pivotability of the control member on the holder 10 is thus ensured. This pivoting takes place against the force of a retaining spring 57 fixed between a stop 58 on the control member 6 and a stop 59 on the holder 10.

Figure 8:
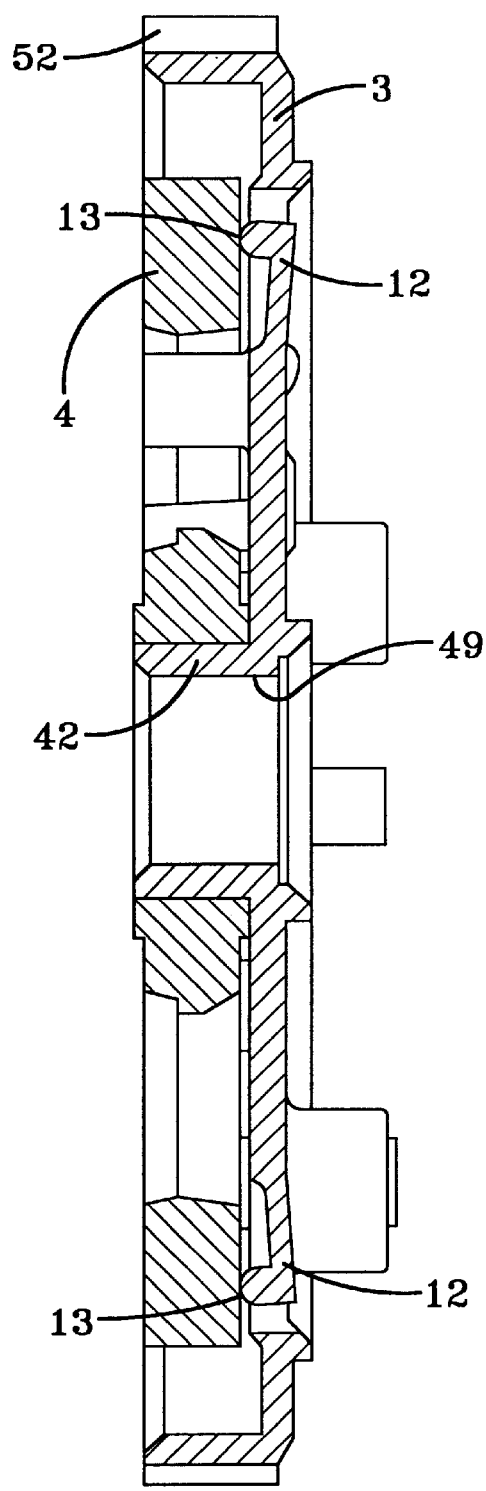
FIG. 8 is a sectional view of the carrier member designed as a ratchet wheel with a belt sensor mass mounted thereon.

As shown, in particular, in FIGS. 6 to 8, the belt sensor mass 4 mounted pivotally on the carrier member 1 is mounted with low friction on rounded contact faces 13. The rounded, in particular hemispherical contact faces 13 are located on spring elements 12 shaped on the carrier member body in recesses of the disc face of the carrier member 3. The rounded bearing faces 13 for the belt sensor mass 4 are located at the respective tips of the spring elements. In the assembled state, the belt sensor mass 4 is located between the internal faces, turned toward one another, of the carrier member 3 and the control member 6. However, mounting on the carrier member 3 is effected with low friction. Defined noiseless axial positioning with minimal friction is thus achieved. If the belt sensor mass 4 has a tendency to move from the set position, the spring elements 12 form reaction forces which ensure that the set position is maintained.

On the back of the carrier member 3 there are projections 60 and 61 which produce the non-rotatable connection to the belt reel 2. Corresponding recesses 63 and 64 (FIG. 1) are provided for this purpose in the belt reel 2. The projections 60 surround recesses 62 in the disc-shaped part of the carrier member 3. Projections 65 which are shaped onto the belt sensor mass 4 project into these recesses. The lateral boundaries of the recesses 62 and the internal faces of the projections 60, which can have a frame-shaped configuration, form stops for limiting the pivoting angle within which the belt sensor mass 4 is mounted pivotally on the carrier member 3. The annular projections 61 on the back of the carrier member 3 are provided next to the approximately trapezoidal frame-like projections 60. The recesses 63 and 64 on the belt reel 2 are accordingly shaped in such a way that a rigid rotational connection is produced between the carrier member 3 and the reel 2. Further elongated stops 68 which extend peripherally round the axis 27 and project into recesses 69 in the belt sensor mass 4 can be provided on the other sides of the carrier member.

Figure 12:
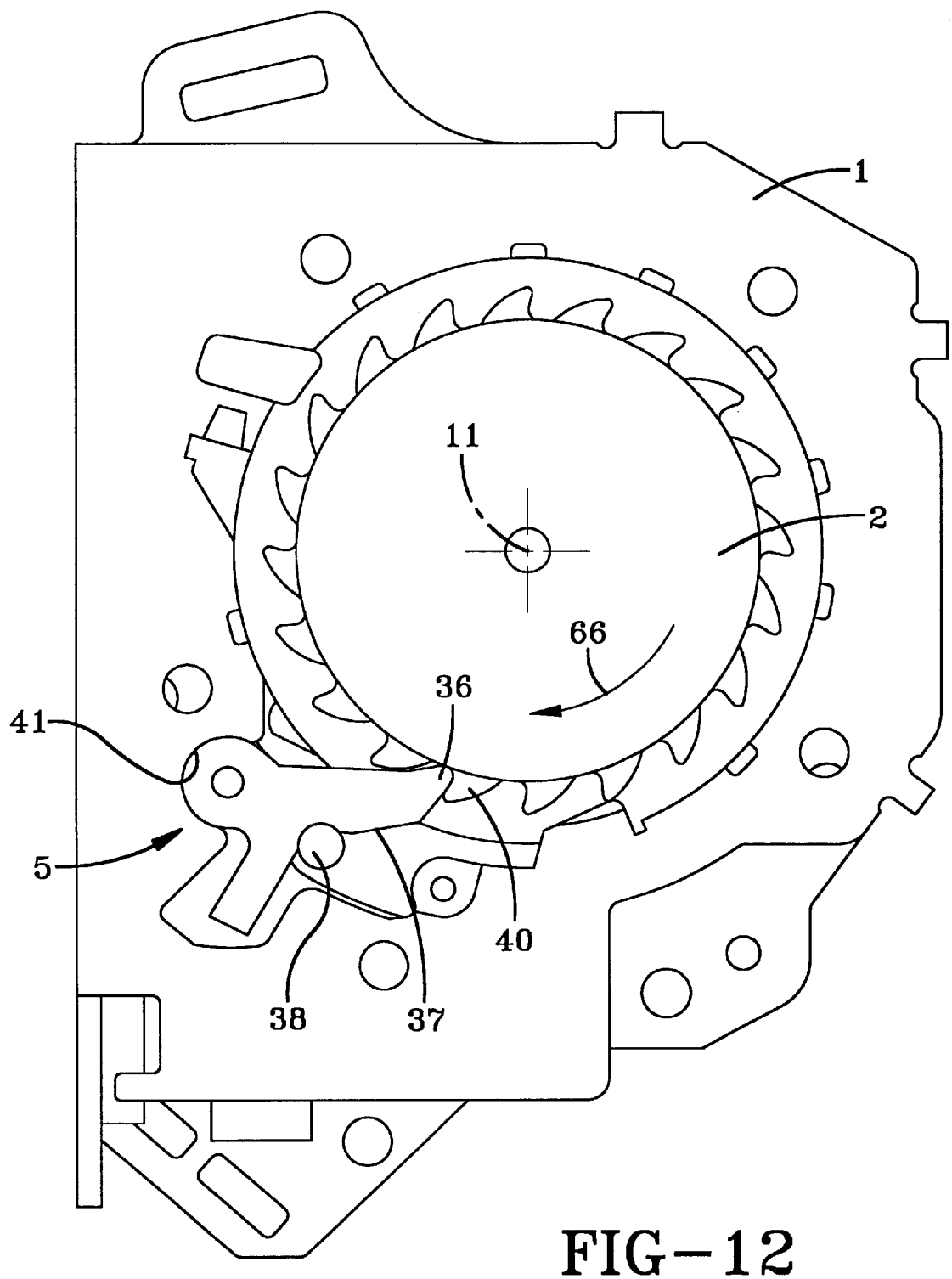
FIG. 12 show the blocking engagement of the blocking pawl in the overtravel position.

If the above-described preblocking state (rotational connection between carrier member 3 and control member 6) is produced by the activated coupling device in response to the vehicle and/or in response to the belt webbing, for example in the case of an accident, a movement of the seat belt webbing in the uncoiling direction is transmitted onto the control member 6 connected non-rotatably to the belt reel 2. The control member 6 is concomitantly pivoted in the uncoiling direction 66 (FIGS. 6, 7, 10 to 12). A movement-transmitting part 38, for example in the form of a pin, fastened on the control member is thus guided along a control face 37 on the blocking device 5. The blocking pawls 36 are thus brought from the normal operating position shown in FIG. 10 into the blocking position shown in FIG. 11. In this blocking position, the blocking pawls 36 engage with their engagement pawl part in the blocking teeth 40 of the belt reel 2. This engagement can take place on both sides of the belt reel 2, as shown in FIG. 1. Differences of angle (up to 3°) resulting from deviations in the tooth pitch are compensated by an overtravel position which is provided on the blocking device 5 and is formed by the end stop 39. This overtravel position is shown in FIG. 12. In this overtravel position, the movement-transmitting part 38 is located on the stop face 39 limiting the overtravel position. The belt reel 2 is blocked against further rotation by the engagement of the blocking pawls 36 in the blocking teeth 40 of the belt reel 2. Forces introduced into the belt reel 2 by the belt webbing are conveyed to the frame 1 by the belt reel 2 and the blocking pawls 36 supported in the support faces 41 on the frame.

What is claimed is:

1. A seat belt retractor comprising
   a seat belt rotatably mounted on a frame for winding the safety belt on and off;
   a blocking means for blocking the rotary movement of the belt reel;
   a control member by which the blocking means is actuable;
   a belt sensor mass which is mounted movably to a carrier member which rotates with the belt reel;
   a vehicle sensor mass,
   a coupling means with which a motion connection can be made between the carrier member and the control member by the belt sensor mass and/or the vehicle sensor mass, for transmitting a rotary movement of the belt reel in the winding-off direction, for actuation of the blocking means, wherein
   the carrier member (3) with the belt sensor mass (4) mounted thereto and the control member (6) are contained in a pre-assemblable structural unit (7);
   characterized in that
   the pre-assemblable structural unit (7) can be fitted on the frame (1) or a holding means which can be secured to the frame (1), wherein
   connecting elements (8, 9), which are fitted one into the other, on the frame (1) or on the holding means (10) and on the pre-assembled structural unit (7) form a rotary mounting for the control member (6) about the reel axis (11).

2. A seat belt retractor as set forth in claim 1 characterised in that the pre-assemblable structural unit (7) further includes the elements of the coupling means (14, 34).

3. A seat belt retractor as set forth in claim 1 or claim 2 characterized in that the connecting elements (8, 9) are in the form of clip elements.

4. Seat belt retractor according to claim 1, characterized in that the blocking means (5) can be actuated by the rotation of the control member (6) which is guided by means of the connecting elements, in particular clip elements (8, 9) which are plugged into one another and are movable relative to one another round the reel axis (11).

5. Seat belt retractor according to claim 1, characterized in that the clip elements (9) on the pre-assembled unit (7) are at an angle greater than 180° on a circular rim (50) of the control member (6).

6. Seat belt retractor according to claim 5, characterized in that the clip elements (9) are within an angle of about 25020 to 260° on the circular rim (50).

7. Seat belt retractor according to claim 1, characterized in that the pivot bearing created by the clip elements (8, 9) has radial play.

8. Seat belt retractor according to claim 1, characterized in that the carrier means (3) and the control member (6) have two mutually opposed parallel faces which extend perpendicularly to the reel axis (11) and between which the belt sensor mass (4), in the form of a disc, is mounted rotatably round the reel axis (11) on the carrier means (3).

9. Seat belt retractor according to claim 8, characterized in that spring elements (12) are provided for forming reaction forces against axial displacement of the belt sensor mass (4) from its set position.

10. Seat belt retractor according to claim 8, characterized in that a plurality of spring elements (12) are arranged in a circle around the reel axis (11).

11. Seat belt retractor according to claim 8, characterized in that the spring elements (12) are integral with the carrier means (3).

12. Seat belt retractor according to claim 8, characterized in that each spring element (12) is a leaf spring.

13. Seat belt retractor according to claim 8, characterized in that each spring element (12) has a rounded contact face (13) against which the belt sensor mass (4) rests.

14. Seat belt retractor according to claim 8, characterized in that four spring elements (12) are provided.

15. Seat belt retractor according to claim 1, characterized in that the coupling means also has a coupling element (34) which is pivotally mounted on the control member (6) and which can be brought into coupling engagement with the carrier means (3) by the vehicle sensor mass (35).

16. Seat belt retractor according to claim 1, characterized in that the movement of the control member (6) for actuating the blocking means (5) can be transmitted by over-travel engagement of the control member on the blocking means.

17. Seat belt retractor according to claim 1, characterized in that the blocking means (5) comprises at least one blocking pawl (36) which is supported on the frame (1) and which can be moved in blocking engagement with the belt reel (2) by the control member (6).

18. Seat belt retractor according to claim 16, characterized in that the movement of the control member (6) can be transmitted onto the blocking pawl (36) by a movement-transmitting element (38) guided along a control face (37), an end stop (39) which forms the over-travel position being provided on the control face (37).

19. Seat belt retractor according to claim 1, characterized in that the control member (6), the carrier means (3) and the coupling elements (14 and 34) consist of plastic material.

20. Seat belt retractor according to claim 1, characterized in that the carrier means (3) and the control member (6) are connected to one another by a plug-in connection which simultaneously forms a pivot bearing (42, 47) for the rotatable mounting of the carrier means (3) on the control member (6).

21. Seat belt retractor according to claim 20, characterized in that the plug-in connection forming the pivot bearing (42, 47) is formed by a bearing bush (42) on the carrier means (3) and a bearing bush (47) on the control member (6) which are plugged into one another with an axial securing means (48, 49).

* * * * *